Patented Dec. 8, 1936

2,063,568

UNITED STATES PATENT OFFICE 2,063,568

DYESTUFFS OF THE PYRENE SERIES AND PROCESS OF PREPARING THEM

Heinrich Vollmann, Frankfort-on-the-Main-Hochst, and Hans Becker, Hofheim (Taunus), Germany, assignors to General Aniline Works, Inc., New York, N. Y., a corporation of Delaware No Drawing. Application February 19, 1934, Serial No. 712,060. In Germany February 25, 1933

11 Claims. (Cl. 260—61)

The present invention relates to new dyestuffs of the pyrene series and to a process of preparing them.

We have found that deeply colored uniform pyrenequinone derivatives are obtainable by causing tetrachloropyrenequinone, melting at 325° C., obtainable from hexachloropyrene, for instance by means of nitric acid according to the process of application Serial No. 687,914, filed September 1, 1933, in the names of Heinrich Vollmann and Hans Becker, and having probably the constitution of a 2,5,7,10-tetrachloropyrene-3,8-quinone (Formula I) to react with ammonia or an amino compound containing at least one hydrogen atom bound to the nitrogen, i. e. a primary or secondary, aliphatic or aromatic amine, advantageously in the presence of an organic solvent. The reaction, during which hydrogen halide is evolved, takes the following course:

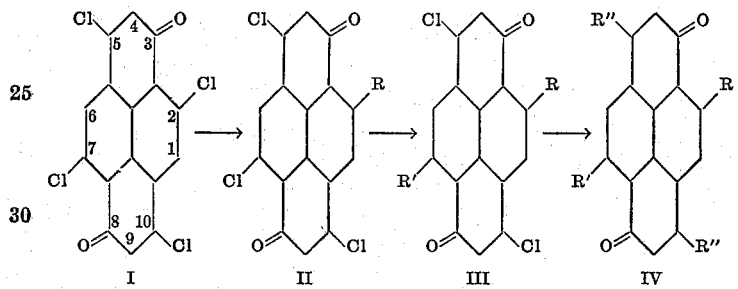

I    II    III    IV wherein R, R' and R" represent the $NH_2$-group or the radicals of the above named amino compounds.

When an amino compound especially a liquid one is used as a component for the reaction an excess of it may be used instead of a solvent. In some cases it is advantageous to carry out the reaction in the presence of an acid binding agent.

The reaction begins when the components are mixed together at room temperature. It is, however, advantageous to accelerate the reaction by heating the reaction components.

According to the conditions applied, i. e. degree of temperature, ratio of the components, time of reaction and presence or absence of an inert solvent, an acid binding agent or an agent catalytically accelerating the exchange of halogen, one or more chlorine atoms may be exchanged for the basic radicals. (Formulae II, III and IV.) It is particularly easy to cause one or two of the chlorine atoms present—probably those in peri-position to the quinone-carbonyls—to enter into reaction. The products thus obtainable which still contain chlorine in the pyrenequinone nucleus may also be used as starting materials in the process of the present invention, that is to say, they may be reacted with ammonia or an amino compound of the above definition. It is thus possible to introduce different basic groups, one after the other, into the pyrenequinone molecule, for instance, arylamino- and alkylamino-radicals.

The products obtainable according to the present process are new and may be characterized by the following general formula:

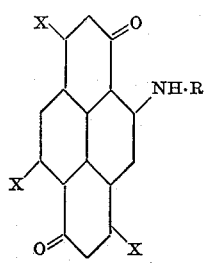

wherein R represents hydrogen, alkyl or aryl, X chlorine, $NH_2$, NH-alkyl or NH-aryl. They have a violet-red, greenish-blue to pure green color. Most of them are suitable for use as dyestuffs and are easily crystallized compounds.

The 2,7-di-arylaminopyrene-3,8-quinones, for instance, are vat dyestuffs and may be used for dyeing or printing cotton according to the usual methods. In contradistinction to the 1,4- or 1,5-diarylamino-anthraquinones, they may also be transformed without difficulty into the corresponding leuco sulfuric acid esters which may be used according to known methods.

The following examples serve to illustrate the invention but they are not intended to limit it thereto; the parts are by weight:

(1) 37 parts of tetrachloropyrenequinone, melting at 325° C., are well stirred with 500 parts of aniline. Even at ordinary temperature part of the red-orange quinone dissolves; the solution becomes green after a short time. In order to complete the reaction, the reaction mixture is heated to 50° C. whereby small needles of a dark violet luster are precipitated and a thick magma-like mass is formed. It is filtered from the solution by suction and washed with alcohol. According to the analysis, the product obtained is a mono-anilino-trichloropyrenequinone. It melts at 269° C.-270° C. It dissolves in sulfuric acid of 60% to a blue-green solution and in concentrated sulfuric acid to an olive-green solution. When the solution is allowed to stand or is heated, its color turns red-brown. The product yields a pure yellow vat and dyes cotton olive-green tints.

(2) 37 parts of tetrachloropyrenequinone, melting at 325° C., and 18 parts of para-toluidine are heated in 500 parts of nitrobenzene for 1 hour at 100° C., while stirring. After a short time, a thick crystalline magma precipitates from the green solution; after cooling, it is filtered by suction and the solid matter is washed with hot alcohol. The mono-para-toluidine-trichloropyrenequinone, thus obtained, crystallizes in the form of reddish dark-green needles having a metallic luster which dissolve in sulfuric acid of 60% to a blue-green solution and in concentrated sulfuric acid to an olive solution and melt at 297° C.

(3) 18 parts of tetrachloropyrenequinone, melting at 325° C., are heated to boiling in a finely dispersed state with 20 parts of beta-naphthylamine in 500 parts of glacial acetic acid. The solution soon assumes a green color and, after a short time, the reaction product begins to precipitate in the form of fine needles.

By recrystallization from nitrobenzene, the beta-naphthylamino-trichloropyrenequinone thus prepared is obtained in the form of brownish brilliant needles. It dissolves in concentrated sulfuric acid to an olive solution which quickly assumes a brown coloration. The compound dyes cotton in a yellow vat; after exposure to air, subdued green dyeings are obtained.

(4) 18 parts of tetrachloropyrenequinone, melting at 325° C., and 20 parts of para-aminodiphenyl are heated with 300 parts of chlorobenzene in the course of 1 hour at about 100° C. After cooling, the product precipitates in the form of green needles. It is isolated by filtering with suction. Its properties are quite similar to those of the monoarylido-trichloropyrenequinones described in the foregoing examples. By using instead of para-aminodiphenyl para-anisidine, the corresponding para-anisido-trichloropyrenequinone is obtained which crystallizes from nitrobenzene in long reddish needles having a metallic luster and melting at 319° C.

(5) 12 parts of alpha-aminoanthraquinone, 18 parts of tetrachloropyrenequinone, melting at 325° C., and 500 parts of nitrobenzene are heated for about a quarter of an hour at 150° C. Thereby, a green solution is obtained from which, on cooling, the reaction product crystallizes in the form of dark green needles. The product dyes cotton in a yellow-brown vat; the dyeings obtained, after exposure to air, are olive-green.

(6) 37 parts of tetrachloropyrenequinone, melting at 325° C., 500 parts of nitrobenzene and 30 parts of anthranilic acid ethyl ester are stirred for about 1 hour at 100° C. There is obtained the ester of monoanthranilo-trichloropyrenequinone which crystallizes in dark-green needles, melts at 320° C. and dyes cotton in a brown-yellow vat covered green tints.

In an analogous manner, the free anthranilic acid or other aminobenzene carboxylic acids, for instance, amino salicylic acid or the like, may also be reacted with tetrachloropyrenequinone.

(7) Ammonia is caused to react with 18 parts of tetrachloropyrenequinone which melts at 325° C., and is stirred in 500 parts of nitrobenzene at 100° C.-110° C. Already in the warmth a crystalline product begins to precipitate in the form of violet needles, which, according to analysis, is a monoamino-trichloropyrenequinone. It dissolves in organic solvents to a violet-red solution, in sulfuric acid of 60% to a red solution and in concentrated sulfuric acid to a blue-green solution.

By introducing at higher temperature, for instance, at boiling temperature, ammonia into the solution of tetrachloropyrenequinone in nitrobenzene, there is obtained, by way of a diamino-dichloropyrenequinone, tetraaminopyrenequinone which forms bluish-black small needles and is nearly insoluble in organic solvents. It dissolves in concentrated sulfuric acid to a brown solution and yields a brown-yellow vat showing a turbid-violet frothy separation on its surface produced by access of air.

(8) By using in the preceding example methylamine instead of ammonia and by working at temperatures in the neighbourhood of 100° C., monomethylamino-trichloropyrenequinone precipitates from the green-blue solution in the form of reddish dark needles having a metallic luster. The product dyes cotton in a yellow vat greenish-blue tints.

By using ethylamine instead of methylamine, a similar product is obtained.

(9) 37 parts of tetrachloropyrenequinone, melting at 325° C., are heated to boiling for 1 hour with 500 parts of aniline and 40 parts of voluminous magnesium oxide. After cooling, the reaction product, a dark-green crystalline precipitate, is filtered with suction, extracted by boiling with dilute hydrochloric acid and purified, if necessary, by recrystallization from nitrobenzene. There is thus obtained a product which crystallizes in the form of beautiful dark blue-green needles, melts at 335° C. and which, according to the analysis, is a dianilino-dichloropyrenequinone. The product dissolves in sulfuric acid of 60% to a red-violet solution, in concentrated sulfuric acid to a blue-gray solution. On standing, or more quickly by gently heating, the color of the solutions turns red-brown. The product dyes cotton in a yellow alkaline hydrosulfite vat clear yellowish-green tints of good fastness to washing, to chlorine and to light.

(10) 23 parts of para-anisidino-trichloropyrenequinone, melting at 319° C. (obtainable according to Example 4) are heated to boiling for 1 hour in 250 parts of nitrobenzene with addition of 24 parts of para-anisidine and 20 parts of anhydrous sodium acetate. Hereby, a second chlorine atom is exchanged for the para-anisidine radical. The di-para-anisidinodichloropyrenequinone crystallizes from nitrobenzene in long dark-green needles melting at 364° C. In the main, its properties are very similar to those of the dianilinodichloropyrenequinone described in Example 9.

(11) The reaction products of alpha- and beta-naphthylamine obtainable by boiling for 1 hour 18 parts of tetrachloropyrenequinone (melting at 325° C.), 20 parts of the base, 10 parts of anhydrous sodium carbonate and 300 parts of nitrobenzene, likewise crystallize in the form of dark green small needles. The di-alpha-naphthyl-aminodichloropyrenequinone dissolves in concentrated sulfuric acid to a yellow-brown solution and in sulfuric acid of 60% to a green solution. The corresponding solutions of di-beta-naphthyl-aminodichloropyrenequinone are red-brown and green, respectively. Both products dye cotton in yellow vats full green tints.

(12) 20 parts of tetrachloropyrenequinone, melting at 325° C., are heated to boiling under reflux with 200 parts of aniline and 0.5 part of cuprous chloride. The color of the solution is at first green but in the course of a few minutes turns bluish-green, olive and finally gray-green. After cooling, the whole is filtered with suction and the solid matter is washed with alcohol. The reaction product crystallizes in dark laminae having a steel-blue metallic luster, is entirely free from chlorine, melts at 390° C.–395° C. with decomposition and has a content of nitrogen of 9.4% calculated for a tetra-anilinopyrenequinone. It dissolves in concentrated sulfuric acid to a pure reddish-blue solution; the product forms a vat only with difficulty.

(13) 37 parts of tetrachloropyrenequinone, melting at 325° C., are stirred for 1 hour at 180° C. with 400 parts of meta-chloraniline in the presence of 30 parts of potassium acetate. After cooling, the di(meta-chloranilino)-dichloropyrenequinone which has crystallized out is filtered with suction and washed first with alcohol and then with water. The product crystallizes from nitrobenzene in the form of dark, brilliant needles, melting at 358° C. In a yellow-brown vat it yields clear green dyeings of good fastness to washing, chlorine and light. It has a better affinity for the vegetable fiber than the dianilino-dichloropyrene-quinone described in Example 9.

(14) 50 parts of para-diphenylaminotrichloropyrenequinone, obtainable according to Example 4, are heated to boiling for 1½ hours with 20 parts of aniline and 15 parts of anhydrous sodium acetate in 500 parts of nitrobenzene. The reaction product, a paraphenylanilino-anilino-dichloropyrenequinone, is worked up in the usual manner and crystallizes from nitrobenezene in the form of dark green needles. It dissolves in concentrated sulfuric acid to a blue-green solution which soon assumes a brown coloration.

(15) 10 parts of dichlorodianilinopyrenequinone (obtainable according to Example 9) are caused to react at boiling temperature with 9.5 parts of alpha-aminoanthraquinone in 250 parts of nitrobenezene in the presence of 5 parts of calcined sodium carbonate, 5 parts of anhydrous sodium acetate and 0.5 part of copper acetate. The color of the solution which is at first green, gradually turns brown-olive. After about 1 hour, the whole is filtered with suction, while hot, the solid matter is washed with hot chlorobenzene, then with alcohol and the residue is extracted by boiling with acidified water. The reaction product crystallizes in green-black needles, it is free from chlorine, dissolves in concentrated sulfuric acid to a blue-green solution and yields in a red-brown vat greenish-gray tints.

We claim:

1. The process which comprises heating 2,5,7,10-tetra-chloropyrene-3,8-quinone wherein the chlorine atoms may partly be replaced by amino groups or by nitrogen-bound radicals of amino compounds, with a compound of the group consisting of ammonia, and an amino compound containing at least one hydrogen atom bound to the nitrogen, in the presence of an organic solvent.

2. The process which comprises heating 2,5,7,10 tetra-chloropyrene-3,8-quinone wherein the chlorine atoms may partly be replaced by nitrogen-bound radicals of a primary aromatic amine, with a primary aromatic amino compound, in the presence of an organic solvent.

3. The process which comprises heating 2,5,7,10 tetra-chloropyrene-3,8-quinone with a primary aromatic amino compound, in the presence of an organic solvent.

4. The process which comprises heating at about 100° C. for about one hour 2,5,7,10-tetra-chloropyrene-3,8-quinone with para-amino-diphenyl in presence of chlorobenzene.

5. The process which comprises boiling for about one hour 2,5,7,10-tetra-chloropyrene-3,8-quinone with an excess of aniline in presence of magnesium oxide powder.

6. The process which comprises heating at about 180° C. for about one hour 2,5,7,10-tetra-chloropyrene-3,8-quinone with an excess of m-chloroaniline in the presence of potassium acetate.

7. The compounds of the general formula:

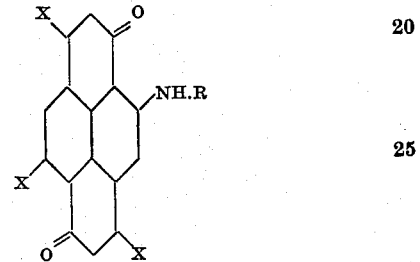

wherein R represents hydrogen, alkyl or aryl, X chlorine, $NH_2$, NH-alkyl or NH-aryl.

8. The compounds of the general formula:

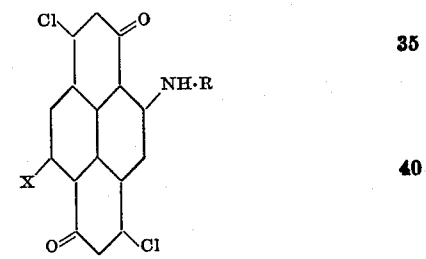

wherein R represents hydrogen, alkyl or aryl, X chlorine, $NH_2$, NH-alkyl or NH-aryl.

9. The compound of the formula:

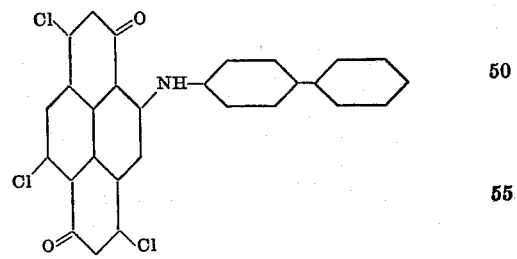

forming green needles.

10. The compound of the formula:

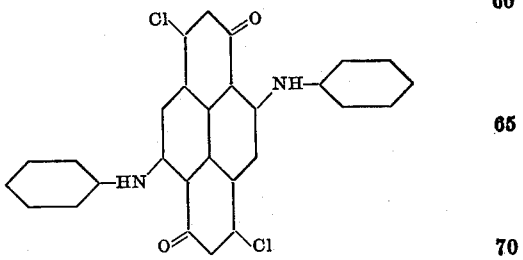

crystallizing in beautiful dark-blue-green needles of a melting point of 335° C., dyeing cotton from a yellow alkaline hydrosulfite vat clear yellowish-green tints of good fastness to washing, chlorine and to light.

11. The compound of the formula:
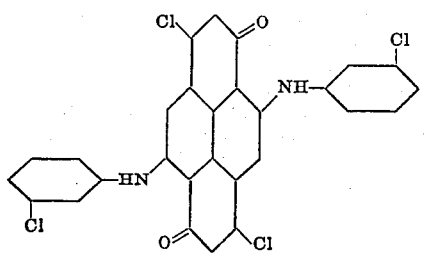
forming brilliant needles of a melting point of 358° C., yielding from a yellow-brown vat clear green tints of good fastness to washing, chlorine and to light.
HEINRICH VOLLMANN.
HANS BECKER.